March 29, 1966     T. J. SCHOENECKER     3,243,263
DISSOLVER HAVING FILTER BAG-LINED SALT DISSOLVING CHAMBER
Filed Jan. 12, 1962
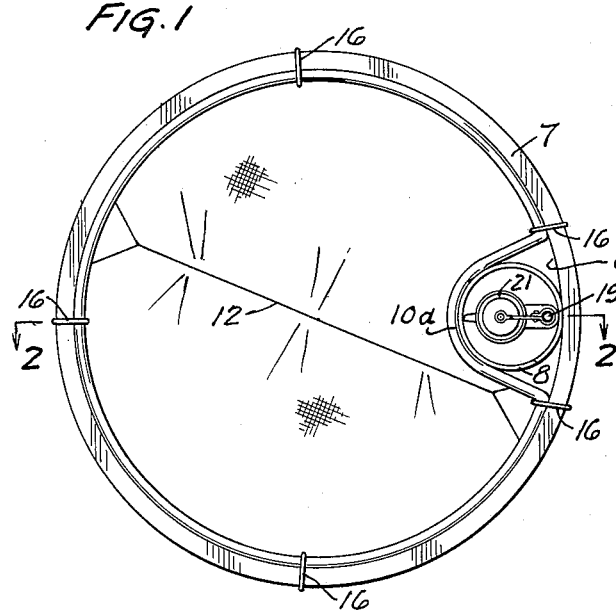
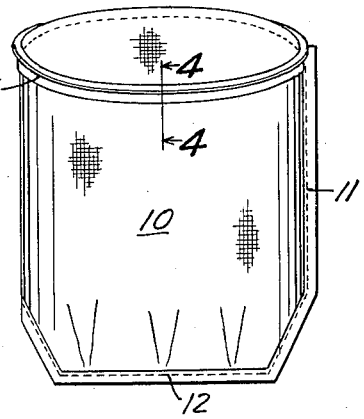
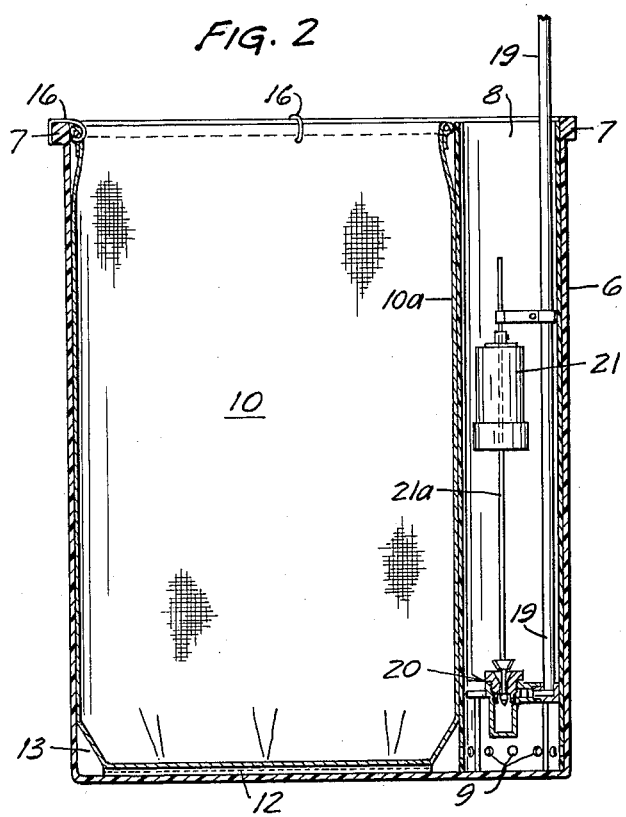
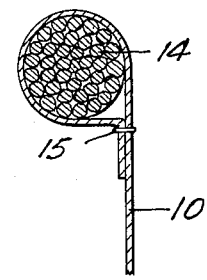
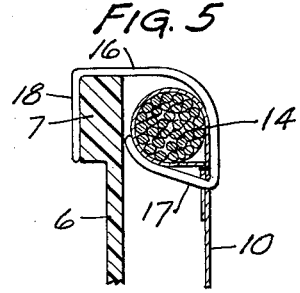
INVENTORS
THOMAS J. SCHOENECKER
DUANE D. NOWLIN
BY John E. Stryker
ATTORNEY United States Patent Office 3,243,263
Patented Mar. 29, 1966

3,243,263
DISSOLVER HAVING FILTER BAG-LINED SALT DISSOLVING CHAMBER
Thomas J. Schoenecker, North St. Paul, and Duane D. Nowlin, Wyoming, Minn., assignors to Union Tank Car Company, Chicago, Ill., a corporation of New Jersey
Filed Jan. 12, 1962, Ser. No. 165,906
8 Claims. (Cl. 23—267)

This invention relates to improvements in regenerant reservoirs for water treatment apparatus including water softeners having regenerant tanks containing or adapted to contain a large supply of solid regenerant such as common salt, and means for alternately supplying water or other liquid to the tank and for withdrawing the regenerant solution therefrom periodically.

Controls for metering the liquid to the tank and for withdrawing measured quantities of the regenerant solution therefrom are commonly contained in a relatively small brine well located within the tank and communicating with the lower portion of the tank through one or more openings in a side wall or bottom of the well. Heretofore, malfunctioning of the controls for such water treatment apparatus of the automatic and semi-automatic types have been caused most frequently by the presence of solid impurities in the nature of silt carried in the regenerating solution. Such impurities accumulate in flow control orifices and on valve seats and closure members causing malfunctioning and necessitating repairs.

It is, therefore, an object of our invention to obviate such malfunctioning of water treatment apparatus by providing an efficient and durable filter medium containing the supply of solid regenerant in the regenerant tank or reservoir whereby substantially all of the solid impurities in the regenerant tank are prevented from entering the flow system.

A particular object is to provide a regenerant reservoir of large capacity having a removable bag-like lining adapted to contain the regenerant in solid form and fitting loosely in an open top tank, the bag-like liner or solid regenerant container being formed from a woven or felted fiber to provide pores or mesh openings of sizes adapted to confine within the container such particles of silt and other insoluble impurities as are present in the common salt or other solid regenerant to be used.

Another object is to provide a fine mesh lining bag for a regenerant reservoir of such flexible and durable character as to give it a long useful life in the reservoir.

A further object is to provide a fine mesh, flexible and durable bag-like container which is readily removable from a regenerant tank for periodic washing.

Our invention also includes certain other novel features of construction which will be described and pointed out in the following specification and claims.

Referring to the accompanying drawing:

FIGURE 1 is a plan view of a regenerant reservoir embodying our invention;

FIG. 2 is a central vertical sectional view of the same, taken approximately on the line 2—2 of FIG. 1;

FIG. 3 is a perspective view showing the fabric container separate from the tank;

FIG. 4 is a fragmentary cross sectional view taken on the line 4—4 of FIG. 3, and FIG. 5 is a fragmentary vertical sectional view showing one of the hook supports for the porous container in the tank.

As shown in the drawing, our reservoir includes a generally cylindrical outer tank 6 having a closed bottom, an open top, and an annular reinforcing bead 7 defining the top opening. Mounted within the tank 6 and extending to the bottom thereof is a well 8 for regenerant solution. A plurality of openings 9 extend through the lower wall portion of the well 8 to provide continuous communication between the well and lower portion of the tank 6.

Fitting loosely within the tank 6 is a flexible fabric container 10 for the solid regenerating material. This container is constructed from a tough synthetic fiber material, preferably woven, to provide openings for the passage of liquid to and from its interior of sizes within the range 100 to 40 openings per lineal inch. A suitable material is a monofilament polyethylene fabric made from fibers of approximately .008 inch thickness. A number of other known synthetic fiber materials are suitable for the fabrication of the container 10. Examples are polypropylene fibers or "Saran," a copolymer of vinylidene chloride and vinyl chloride. Synthetic cloth materials of this character and having mesh sizes from 70 to 63 openings per lineal inch have been used successfully as the material for the container 10.

As indicated in FIGS. 2 and 3, such flexible fabric materials may be formed into a generally cylindrical bag shape by joining vertical edges along a seam 11, either sewn or heat sealed at the periphery of the bag and by closing the bottom along a similar seam 12. The material is gathered along the seam 12 to provide pleats radiating obliquely outwardly and upwardly at opposite sides of the seam. By so shaping the container 10, we provide an annular space 13 between the lower portion of the container 10 and tank 6 for the free circulation of liquid. The annular space 13 insures free flow of liquid around the container 10 within the tank 6 and to and from the openings 9 in the well 8.

The upper margin of the flexible container 10 is folded over an endless flexible reinforcing cord 14 and this cord is held in place by forming a seam 15 in the material, as best shown in FIG. 4. The upper margin of the container 10, thus reinforced, is detachably connected to the bead 7 of the tank 6 by hook members 16. These members may be constructed from stainless steel or other corrosion resistant wire or strips of sheet material having sufficient strength and stiffness to retain their shape. An end portion 17 of each member 16 is bent around the reinforced upper margin of the container 10 and is passed through the fabric so that the reinforced margin is confined and held in place in a suspended position within the tank 6. The outer end portion 18 of each member 16 embraces the bead 7 to support the fabric container wall thereon. As indicated in FIG. 1, a suitable number of the hook members 16 are spaced around the periphery of the tank 6, and a reentrant wall portion 10a of the container 10 is draped partially around the periphery of the well 8 so that the porous container material extends between the well and the space exteriorly thereof within the tank 6.

Regenerant liquid may be withdrawn from the well 8 and make-up water may be supplied to the well by any suitable valve mechanism. By way of example, suitable means for supplying liquid to and withdrawing regenerant solution from the well 8 are shown in FIG. 2. As illustrated, a conduit 19 is connected to a valve 20 mounted in the lower portion of the well 8. This valve is operatively connected to a float body 21 by a vertically extending rod 21a in the well 8. Details of this float actuated valve and its operation are described in Techer Patent No. 2,904,062, granted September 15, 1959. It will be evident that the regenerant solution may be fed through the conduit 19 to water treatment apparatus of many known and convenional types, either of the semi-automatically controlled, or completely automatically controlled types.

In operation, the solid regenerant material, either in the form of coarse crystals or pellets may be charged into the container 10 to provide a large reserve supply therein. Water to form the regenerant solution is fed into the well 8 through conduit 19 and valve 20 and passes through the openings 9 into the lower portion of the tank 6 surrounding the container 10 and thence through the pores in the container 10, rising to form brine to a predetermined high level. According to conventional procedure, when regeneration is required, a measured quantity of salt solution is drawn from the well 8 which is supplied with the solution by flow through the pores of the container 10, annular passage 13 and openings 9 into the well 8. Substantially all of the insoluble impurities are retained within the container 10. Accumulations of solid particles may be removed from the container 10 periodically by removing the container from the tank 6 and washing the interior and exterior surfaces of the container.

A number of advantages are derived from the use of our reservoir wherein the solid regenerant is contained in the flexible porous bag or container 10. The use of inexpensive grades of solid regenerants, such as rock salt containing substantial amounts of impurities is made feasible.

Our invention also obviates objectionable bridging of the salt across the tank. This difficulty is caused by the adherence of the salt to the walls of the tank and the formation of a solid horizontally extending mass of salt at an elevation above the level of the liquid in the lower portion of the reservoir. When this occurs, the bridge of salt must be broken down manually to restore normal operation. By providing our porous flexible bag between the mass of solid regenerant and tank wall, we insure continuous wetting of the periphery of the mass of solids by capillary flow of the liquid through the pores of the bag material and thereby free the solids to settle continuously into the liquid in the reservoir.

By fabricating the flexible, readily washable container 10 from strong synthetic fibers, we make it so durable that it has a useful life expectancy of several years in the reservoir. More reliable and trouble-free operation of the controls for the flow system is also promoted by our improved means for eliminating the fouling of the orifices, valve closure members and valve seats.

We claim:

1. In a regenerant supply system for liquid treatment apparatus comprising:
   (A) a tank having a closed bottom, a top opening and a side wall,
   (B) wall means contiguous with said tank defining a relatively small well for liquid regenerant, there being a liquid communication passage connecting said well and tank closely adjacent the closed bottom thereof,
   (C) a porous fabric container for solid regenerant having a closed bottom, a top opening, and a side wall, the side wall of said container being in contact with the side wall of said tank for substantially the entire length thereof except for the area adjacent said closed bottom, and
   the improvement facilitating free circulating of liquid around said container without undue loss of solid regenerant storage space comprising:
      the side wall of said container being spaced inwardly from the side wall of said tank in said area adjacent said closed bottom of said tank so as to define an open annular space around said container only in the area adjacent said communicating passage.

2. In a regenerant supply system, a reservoir in accordance with claim 1 in which the pores in the fabric of said container for the passage of liquid to and from the interior of said container are within the size range 100-40 openings per lineal inch.

3. In a regenerant supply system, a reservoir in accordance with claim 1 in which said tank has an annular rim defining its top opening and said porous fabric container has annular reinforcing means for the top margin thereof, and said means for detachably supporting the walls of said container within said tank comprise a plurality of hook members for supporting the reinforced margain of said container on said rim of the tank.

4. In a regenerant supply system, a reservoir in accordance with claim 1 in which the fabric of said porous container comprises tough flexible synthetic resin fibers of apparoximately .008 inch thickness.

5. A regenerant supply system in accordance with claim 1 including float actuated valve means disposed in said well to control the flow of liquid between said well and said conduit means.

6. In a regenerant supply system for liquid treatment apparatus comprising:
   (A) a tank having a closed bottom, a top opening and a vertical side wall,
   (B) vertical wall means contiguous with said side wall defining a relatively small vertical well for liquid regenerant, there being a liquid communication passage connecting said well and tank closely adjacent the closed bottom thereof,
   (C) a porous fabric container for solid regenerant having a top opening and a vertical side wall, the side wall of said container being in contact with the side wall of said tank for substantially the entire length thereof except for the area adjacent said closed bottom, and
   the improvement facilitating free circulation of liquid around said container without undue loss of solid regenerant storage space comprising:
      the bottom of said container being closed by a seam extending generally across the center portion of said bottom of said container so as to cause the side wall of said container to slant inwardly away from the side wall of said tank in said area adjacent said closed bottom of said tank and thereby define an open annular space around said container in horizontal planes including that of said communicating passage.

7. In a regenerant supply system for liquid treatment apparatus comprising:
   (A) a tank having a closed bottom, a top opening and a side wall,
   (B) means defining a relatively small well for liquid regenerant, there being a liquid communication passage connecting said well and tank closely adjacent the closed bottom thereof,
   (C) a porous fabric container for solid regenerant having a top opening and a side wall, the side wall of said container being in contact with the side wall of said tank for substantially the entire length thereof except for the area adjacent said closed bottom, and
   the improvement facilitating free circulation of liquid around said container without undue loss of solid regenerant storage space comprising:
      the bottom of said container being closed by a seam, and pleats extending generally upwardly and outwardly from such seam so as to space the side wall of said container inwardly from the side wall of said tank in said area adjacent said closed bottom of said tank and thereby define an open annular space around said container in the area adjacent said communicating passage.

8. In a regenerant supply system for liquid treatment apparatus comprising:
   (A) a tank having a closed bottom, a top opening and a straight, vertical side wall,
   (B) vertical wall means contiguous with the inside of said tank defining a relatively small well for liquid regenerant, there being a liquid communication passage connecting said well and tank closely adjacent the closed bottom thereof,
   (C) a porous synthetic, limp fabric container for solid regenerant having a closed bottom, a top opening, and a vertical side wall, annular reinforcing means at the top of said container supporting same so that the side wall of said container is in contact with the side wall of said tank for substantially the entire length thereof except for the area adjacent said closed bottom, and the improvement facilitating free circulation of liquid around said container without undue loss of solid regenerant storage space in said tank comprising:

a single seam closing the bottom of said container, and a plurality of pleats extending generally upwardly and outwardly from such seam so as to cause the bottom portion of the side wall of said container to be spaced inwardly from the side wall of said tank in said area adjacent said closed bottom of said tank so as to define an open annular space around said container only in the area adjacent said communicating passage.

References Cited by the Examiner

UNITED STATES PATENTS

| | | | |
|---|---|---|---|
| 342,151 | 5/1886 | Walls | 210—284 X |
| 640,665 | 1/1900 | King | 210—283 X |
| 664,387 | 12/1900 | Doderlein | 23—272 |
| 763,152 | 6/1904 | Burton | 23—267 X |
| 797,882 | 8/1905 | Anderson | 23—272 |
| 1,125,590 | 1/1915 | Nunez | 23—272.6 |
| 1,319,661 | 10/1919 | Tone | 23—272.6 |
| 2,086,607 | 7/1937 | Culligan | 210—191 |
| 2,456,524 | 12/1948 | Meincke | 210—206 X |
| 3,008,486 | 11/1961 | Schulze et al. | 210—140 X |

NORMAN YUDKOFF, *Primary Examiner.*